United States Patent [19]

Trumbull et al.

[11] 4,360,612
[45] Nov. 23, 1982

[54] AGGLOMERATE-FREE, BUBBLE-FREE, HIGH BARRIER VINYLIDENE CHLORIDE POLYMER FILMS AND PROCESS OF PREPARATION

[75] Inventors: Walter A. Trumbull; Angela J. Williams, both of Midland, Mich.

[73] Assignee: The Dow Chemical Company, Midland, Mich.

[21] Appl. No.: 225,594

[22] Filed: Jan. 16, 1981

[51] Int. Cl.$^3$ .......................... C08K 3/10; C08K 5/42
[52] U.S. Cl. ................................. 523/351; 523/353; 524/160; 524/161; 524/568; 524/210
[58] Field of Search ......... 260/42.49, 45.7 S, 45.7 PS, 260/45.75 F, 30.8 R; 525/3; 523/351, 353; 524/568, 161, 160

[56] References Cited

U.S. PATENT DOCUMENTS

| | | | |
|---|---|---|---|
| Re. 29,040 | 11/1976 | Marzolf | 260/42.56 |
| 3,169,053 | 2/1965 | Sawyer, Jr. et al. | 71/64 |
| 3,190,774 | 6/1965 | Wilson | 149/7 |
| 3,240,641 | 3/1966 | Wilson | 149/46 |
| 3,261,793 | 7/1966 | Stevenson | 525/235 |
| 3,351,471 | 11/1967 | Demler et al. | 99/78 |
| 3,359,225 | 12/1967 | Weisend | 260/29.6 |
| 3,397,097 | 8/1968 | Atadan et al. | 149/46 |
| 3,509,236 | 4/1970 | Sieglar et al. | 525/80 |
| 3,565,975 | 2/1971 | Goff et al. | 525/222 |
| 3,640,697 | 2/1972 | Toops, Jr. | 71/27 |
| 3,844,351 | 10/1974 | Sutton et al. | 166/293 |
| 3,891,598 | 6/1975 | Marzolf | 260/42.56 |
| 3,891,598 | 6/1975 | Marzolf | 260/42.56 |
| 4,269,761 | 5/1981 | Suhoza | 260/45.7 S |

OTHER PUBLICATIONS

Petrochemicals Co. Inc. Listing of Specialty Chemicals, undated; page 1 of Text.
Derwent Abst. 61715Y/35, Toray Ind. KK (J52084265), 7-13-77.
Chem. Abst. 173523e, vol. 91, (1979), Anon. (FDA) Jul. 20, 1979, "Indirect Food Additive . . . ".
Chem. Abst. 50073, vol. 92, #6, (1980), Japan 79-94575, Somar Mfg. Co., Jul. 26, 1979.

*Primary Examiner*—John C. Bleutge
*Assistant Examiner*—Herbert J. Lilling
*Attorney, Agent, or Firm*—D. R. Howard

[57] ABSTRACT

An improved process for preparing extruded films from film-forming polymeric compositions based on vinylidene chloride copolymers and containing one or more inorganic particulate additives and to the films so prepared. The improvement comprises first preparing a preblend of the inorganic particulate additives and an alkali metal salt of an alkylaryl sulfonic acid and, then making an admixture of the preblend and the vinylidene chloride copolymers. The admixture so prepared is then formed into an extruded film by conventional techniques.

10 Claims, No Drawings

AGGLOMERATE-FREE, BUBBLE-FREE, HIGH BARRIER VINYLIDENE CHLORIDE POLYMER FILMS AND PROCESS OF PREPARATION

BACKGROUND OF THE INVENTION

This invention relates to polymeric compositions, in particular to film-forming polymeric compositions based on vinylidene chloride copolymers and to processes for forming polymeric films from such compositions. The films so formed being substantially agglomerate-free and bubble-free.

Copolymers of vinylidene chloride with such copolymerizable monomers as acrylonitrile, vinyl chloride and lower alkyl acrylates have found use in the manufacture of filaments, sheets, tubes, films and extruded and molded shapes. It is known that such polymers are difficult to work with due to their brittleness, relatively poor melt flow and susceptibility to thermal degradation, as evidenced by the development of discoloration and the presence of gas bubbles during the fabrication thereof, particularly during extrusion of film materials therefrom. It has, heretofore, been common practice to incorporate plasticizers into vinylidene chloride polymer compositions to improve their workability. Thus, citric acid esters (see British Pat. No. 739,411), sebacic acid esters (see U.S. Pat. No. 2,604,458) and/or phthalate esters (see British Pat. No. 811,532) have been utilized in combination with vinylidene chloride polymers to produce film materials. Polymer compositions containing such plasticizers in conjunction with various stabilizer systems, e.g., combinations of an epoxidized soybean oil and an oxide of the metals of Group II of the periodic table, such as magnesium oxide, have also been used as disclosed, e.g., in U.S. Pat. No. 3,261,793.

It is known that these plasticized vinylidene chloride polymer compositions are less than wholly satisfactory for a number of reasons, e.g., most of the known plasticizers have poor compatibility with vinylidene chloride polymer compositions and migrate to the surface of articles, such as films, produced therefrom. This result is especially disadvantageous when the polymeric film material is used in food wrapping applications. Further, the presence of such plasticizers often significantly reduces tensile strength and increases gas permeability of polymeric films produced from the vinylidene chloride polymers, particularly permeability to water vapor and air. As such, the addition of plasticizers to vinylidene chloride copolymer compositions to produce polymeric film material is not without problems. However, when film material is produced from normally crystalline vinylidene chloride copolymer compositions without the use of plasticizers, the resultant film material is frequently characterized by the presence of gas bubbles. Gas bubbles are detrimental where clear, continuous film material is required. It is believed that the gas bubbles result when the vinylidene chloride copolymer degrades via dehydrohalogenation to evolve gaseous hydrogen chloride.

A solution to the problem of gas bubbles has been disclosed in U.S. Pat. No. 3,891,598 wherein substantially plasticizer-free extruded film material comprising a blend of a normally crystalline vinylidene chloride interpolymer with small amounts of magnesium oxide was prepared in a process comprising the steps of admixing magnesium oxide in dry powdered form with dry powdered vinylidene chloride polymer to form an admixture; passing the admixture through a screen to remove any agglomerates having a diameter of greater than about 500 microns from the admixture; and fabricating the admixture into film form. A special technique of adding the magnesium oxide to the vinylidene chloride polymer resin was devised to counteract the tendency of magnesium oxide particles to cling to metal surfaces and to thereafter form agglomerates which break off into the extruder melt and result in holes in the film extrudate when the extrudate is formed into a stretched film. The special technique involved conducting the magnesium oxide powder via a flexible tube under the surface of dry vinylidene chloride copolymer particles while such polymeric particles were in motion as in a ribbon or cone blender. Films so produced are often characterized by the presence of small white specks or agglomerates of magnesium oxide and frequently by the presence of small holes.

It is, therefore, the primary object of the present invention to produce vinylidene chloride polymer film materials characterized by reduced permeability to gases such as water vapor and air and which, in addition, can be thermally fabricated, e.g., extruded into film form, in the substantial absence of discoloration, gas bubbles, holes and agglomerates of inorganic particulate additives.

A related object is to produce a vinylidene chloride polymer-magnesium oxide blend which is free-flowing and which is substantially free of agglomerates of magnesium oxide.

A further object is to render the magnesium oxide powder free-flowing thereby negating the tendency of the magnesium oxide to cling to metal surfaces with the consequent formation of agglomerates.

Still another object is to render other inorganic particulate additives, which are not inherently free-flowing and which tend to form agglomerates, generally free-flowing and agglomerate-free.

SUMMARY OF THE INVENTION

The above and related objects are obtained in an improved process for preparing extruded vinylidene chloride copolymer film containing an effective amount of one or more inorganic particulate additives, said film being generally free of bubbles, holes and white specks, said film being made by (a) preparing a blend of (1) a dry, powdered, generally plasticizer-free, normally crystalline vinylidene chloride polymer having polymerized therein from about 70 to about 95 percent by weight vinylidene chloride and from about 30 to about 5 percent by weight of at least one monoethylenically unsaturated monomer copolymerized therewith, and (2) the inorganic particulate additives, each additive having an average particle size of greater than about 0.5 micron and less than about 40 microns, and (b) thermally fabricating said blend into film form by extrusion, the improvement which comprises making a preblend of the inorganic particulate additives with from about 0.02 to about 0.5 weight percent, based on weight of the inorganic particulate additives, of an alkali metal salt of an alkylaryl sulfonic acid, and admixing the preblend with the vinylidene chloride polymer.

The invention also contemplates an improved process for preparing extruded vinylidene chloride copolymer film containing an effective amount of one or more inorganic particulate additives, said film being generally free of bubbles, holes and white specks, said film being made by (a) preparing a blend of (1) a dry, powdered, generally plasticizer-free, normally crystalline vinylidene chloride copolymer having polymerized therein from about 70 to about 95 percent by weight, based on copolymer weight, vinylidene chloride and from about 30 to about 5 percent by weight, based on copolymer weight, of at least one monoethylenically unsaturated monomer copolymerized therewith, and (2) the inorganic particulate additives, each additive having an average particle size of greater than about 0.5 micron and less than about 40 microns, and (b) thermally fabricating said blend into film form by extrusion, the improvement which comprises dividing the inorganic additives into a first portion and a second portion, dividing the vinylidene chloride copolymer into a first portion and a second portion, forming a concentrate, the concentrate being formed by first admixing the first portion of the inorganic additives with from about 0.02 to about 0.5 weight percent, based upon total inorganic additive weight, of an alkali metal salt of an alkylaryl sulfonic acid using a high speed mixing means, then mixing in the second portion of the inorganic additives and the first portion of the vinylidene chloride copolymer, the concentrate then being blended with the second portion of the vinylidene chloride copolymer, whereby the blend and the film made therefrom are generally free of agglomerates without the necessity of an intermediate step to remove agglomerates.

The invention further contemplates a generally plasticizer-free extruded film having an oxygen transmission rate of less than about 0.20 cc of oxygen per 100 square inches per mil per 24 hours per atmosphere at 25° Centigrade (°C.) as determined by ASTM Test No. D 1434–66, said film material comprising a blend of (1) a normally crystalline vinylidene chloride polymer having polymerized therein from about 70 to about 95 percent by weight, based on polymer weight, of vinylidene chloride and from about 30 to about 5 percent by weight, based on polymer weight, of at least one monoethylenically unsaturated monomer copolymerizable therewith, (2) from about 0.2 to about 0.8 percent, based on polymer weight, of magnesium oxide, and (3) from about 0.02 to about 0.5 weight percent, based on weight of magnesium oxide, of an alkali metal salt of an alkylaryl sulfonic acid.

DESCRIPTION OF THE PREFERRED EMBODIMENTS

The normally crystalline vinylidene chloride polymers usable in this invention are well-known and are prepared by interpolymerizing vinylidene chloride with known comonomers. Typical of the normally crystalline polymeric materials falling within the advantageous definition are the polymers and copolymers of at least 70 percent by weight of vinylidene chloride, and preferably those containing from about 70 to about 95 percent by weight vinylidene chloride, with the remainder being composed of one or more other monoethylenically unsaturated monomers copolymerizable therewith exemplary of which are vinyl chloride, vinyl acetate, vinyl propionate, acrylonitrile, alkyl and aralkyl acrylates having alkyl and aralkyl groups of up to about 8 carbon atoms, acrylic acid, acrylamide, vinyl alkyl ethers, vinyl alkyl ketones, acrolein, allyl esters and ethers, butadiene and chloropropene. Ternary compositions may also be employed advantageously. Representative of such polymers are those having polymerized therein at least 70 percent by weight, preferably from about 70 to about 95 percent by weight, vinylidene chloride with the remainder comprising, for example, acrolein and vinyl chloride, acrylic acid and acrylonitrile, alkyl acrylates and alkyl methacrylates, acrylonitrile and butadiene, acrylonitrile and itaconic acid, acrylonitrile and vinyl acetate, vinyl propionate, or vinyl chloride, allyl esters or ethers and vinyl chloride, butadiene and vinyl acetate, vinyl propionate, or vinyl chloride and vinyl ethers and vinyl chloride. Quaternary polymers of similar monomeric composition are also known. Average sizes of vinylidene chloride polymer particles may vary but are desirably less than about 400 microns yet greater than about 40 microns.

The inorganic particulate additives contemplated by the present invention may have an average particle size of up to 10 microns or greater. The inorganic particulate additives are selected from the group consisting of magnesium oxide, tetrasodium pyrophosphate (TSPP), calcium carbonate ($CaCO_3$) and titanium dioxide ($TiO_2$). Inorganic particulate additives selected from the group consisting of magnesium oxide, tetrasodium pyrophosphate and titanium dioxide, desirably have a particle size of less than about 0.5 micron. When the inorganic particulate additive is calcium carbonate, the particle size is desirably about 5 microns. The preferred inorganic particulate additive is magnesium oxide. The amount of magnesium oxide is desirably from about 0.1 to about 0.8 percent by weight based upon weight of the vinylidene chloride polymer. The amount of magnesium oxide is preferably from about 0.3 to about 0.5 percent by weight, based upon weight of the vinylidene chloride polymer. Persons skilled in the art will recognize that at amounts of magnesium oxide greater than about 0.6 percent by weight, based upon weight of the vinylidene chloride copolymer, degradation begins. Persons skilled in the art will also recognize that magnesium oxide concentrations of greater than about 10 percent by weight, based upon weight of the vinylidene chloride copolymer, promote degradation of the vinylidene chloride copolymer during extrusion processing thereof, and that concentrations greater than 10 percent by weight are not commercially feasible.

The alkali metal salts of an alkylaryl sulfonic acid are well-known and may be produced by the methods described in U.S. Pat. No. 2,773,896 and in Kirk Othmer's Encyclopedia of Chemical Technology, Second Edition, published by the Interscience Encyclopedia, Inc., Vol. 13, pp. 678–79, the teachings of which are incorporated herein by reference thereto. The alkali metal salts of alkylaryl sulfonic acids desirably are dry particulate sodium salts of condensed mononaphthalene sulfonic acids. Preferably, the alkali metal salts of alkylaryl sulfonic acids are selected from the group consisting of sodium monomethylnaphthalene sulfonate, sodium dimethylnaphthalene sulfonate, or mixtures thereof. Most preferably, the alkylnaphthalene sodium sulfonate compound is a mixture of sodium monomethylnaphthalene sulfonate and sodium dimethylnaphthalene sulfonate, the mixture having a molar ratio of sodium dimethylnaphthalene sulfonate to sodium monomethylnaphthalene sulfonate of from about 65:35 to about 50:50. The amount of alkali metal salts of alkylaryl sulfonic acid desirably is from about 0.02 to about 0.5 weight percent based upon weight of the inorganic particulate additives. Preferably, the amount of alkali metal salts of alkylaryl sulfonic acid is from about 0.02 to about 0.20 weight percent based upon weight of the inorganic particulate additives. Most preferably, the amount of alkali metal salts of alkylaryl sulfonic acid is from about 0.05 to about 0.1 weight percent, based upon weight of the inorganic particulate additives. Although a broad range of particle sizes will suffice, particles of the alkali metal salts of an alkylaryl sulfonic acid are desirably less than about 250 microns, preferably less than about 100 microns.

The preferred process for blending the normally crystalline vinylidene chloride copolymer, the copolymer consisting of a first portion and a second portion, with the inorganic particulate additives, the additives consisting of a first portion and a second portion, and an alkali metal salt of an alkylaryl sulfonic acid as described herein comprises forming a concentrate by first admixing the alkali metal salt of an alkylaryl sulfonic acid with the first portion of the inorganic particulate additives using a high speed blending means, then mixing in the second portion of the inorganic particulate additives and the first portion of the vinylidene chloride copolymer, said mixing continuing until a generally uniform distribution of the inorganic particulate additives and the alkali metal salt of an alkylaryl sulfonic acid throughout the first portion of the vinylidene chloride copolymer is obtained, the concentrate then being admixed with the second portion of the vinylidene chloride polymer, such admixing continuing for a period of time sufficient to ensure that a generally uniform distribution of the concentrate throughout the second portion of the vinylidene chloride polymer is obtained.

An alternate process for blending the normally crystalline vinylidene chloride copolymer with the inorganic particulate additives and the alkali metal salt of an alkylaryl sulfonic acid as described herein comprises forming a blend by admixing the alkali metal salt of an alkylaryl sulfonic acid, in dry powder form, with the inorganic particulate additives, in dry powder form, using a high speed blending means, and thereafter admixing the blend with the vinylidene chloride copolymer for a time sufficient to ensure that a generally uniform distribution of the inorganic particulate additives and the alkali metal salt of an alkylaryl sulfonic acid throughout the vinylidene chloride copolymer is obtained.

It is necessary that, with either process, the alkali metal salt of an alkylaryl sulfonic acid be admixed with the inorganic particulate additives to the extent that a generally uniform distribution of the alkali metal salt of an alkylaryl sulfonic acid throughout the inorganic particulate additives is obtained in order that the improvement of the present invention be fully realized. Persons skilled in the art will recognize that mixing times will vary with the blending technique and apparatus chosen. Generally, it is sufficient, when using a high intensity blender, such as a Model 2457 Welex blender, to admix the alkali metal salt of an alkylaryl sulfonic acid with either the first portion of the inorganic particulate additives or all of the inorganic particulate additives, depending upon the process selected, for a period of from about 3 to about 5 minutes. Further mixing may then take place using any conventional blending apparatus which will ensure generally uniform distribution of the inorganic particulate additives and the alkali metal salt of an alkylaryl sulfonic acid throughout the vinylidene chloride copolymer. Illustrative apparatus include a ribbon blender, a tumble blender and a compounding roll mill.

The presence of magnesium oxide in the vinylidene chloride polymer prevents gas bubble formation or gassing in the film without significant increase in the oxygen or water transmission rates of such film. Further, the presence of the magnesium oxide permits utilization of significantly higher extrusion temperatures than is otherwise possible which, in turn, permits the utilization of vinylidene chloride polymers having a wide range of molecular weights in combination with high extrusion rates. Persons skilled in the art will recognize that, in addition to other difficulties encountered with the use of magnesium oxide powder, the magnesium oxide powder cannot be fed by itself into an extruder as it causes excessive torque on the extruder screws. Accordingly, a method, such as that of the present invention, must be devised to add the magnesium oxide powder to the vinylidene chloride copolymer powder.

The addition of an alkali metal salt of an alkylaryl sulfonic acid to an inorganic particulate additive in accordance with the present invention renders the additive free flowing and prevents the clumping, caking or agglomerating which is normally associated with fine particulates. Magnesium oxide powder, the preferred inorganic particulate additive, is noted for its tendency to cling to metal surfaces. However, when the alkali metal salt of an alkylaryl sulfonic acid is added to the magnesium oxide powder in accordance with the present invention, the magnesium oxide powder is not only free-flowing and generally free of agglomerates, but is also marked by a general lack of any tendency to cling to metal surfaces. In addition, when the magnesium oxide powder, modified in accordance with the present invention, is added to the vinylidene chloride polymer powder, a surprisingly smooth, free-flowing blend, or polymer admixture, which is generally free of agglomerates is the result.

As such, the need for a separate step of screening out agglomerates prior to further processing, such as extrusion of the polymer admixture is generally reduced. An added benefit is that, by eliminating generally all of the magnesium oxide waste in the form of agglomerates, smaller quantities of magnesium oxide are required than were required by prior art processes. Still another benefit is that no special equipment or technique is required to add the free flowing magnesium oxide powder to the vinylidene chloride polymer powder. Yet another benefit is that by having a uniform dispersion of magnesium oxide powder throughout the vinylidene chloride copolymer powder which is substantially free of agglomerate, a high quality film with increased thermal stability, when compared to a film produced from the vinylidene chloride copolymer powder without the magnesium oxide powder dispersed therein, is produced. Similar benefits are realized for the other inorganic particulate additives previously identified.

It may further be desired to formulate the polymer admixtures contemplated herein with conventional modifying materials to provide added strength and/or flexibility. Preferable modifying materials are the ethylene vinylalkanoate copolymers as disclosed in U.S. Pat. No. 3,322,862, the teachings of which are incorporated herein by reference thereto, containing (1) from about 25 to about 85 percent by weight ethylene and (2) complementarily from about 15 to about 75 percent by weight of a vinyl alkanoate, the acid portion of such vinyl alkanoate containing from 2 to 8 carbon atoms. Included within such definition of vinyl alkanoates are vinyl acetate, vinyl propionate, vinyl butyrate, vinyl 2-ethyl hexoate and mixtures thereof. Other polymeric modifiers may also be used if desired, including the hydroxylated ethylene polymers as disclosed in U.S. Pat. No. 3,631,226; copolymers of vinyl chloride and vinyl alkanoates as disclosed in U.S. Pat. No. 3,565,975; copolymers of a conjugated diolefin and lower alkyl acrylates and methacrylates or alkenyl ketones and the like, as disclosed in U.S. Pat. Nos. 3,166,526; 3,165,491; and 3,194,778, the teachings of which are incorporated herein by reference thereto. When adding such materials, it is preferable to admix them with the blend of vinylidene chloride polymer, magnesium oxide and the alkali metal salt of an alkylaryl sulfonic acid in the extruder used to form such mixtures into polymeric film.

The above-described blends may be extruded, using conventional equipment, into single or multi-ply, oriented or unoriented film structures. Exemplary of highly useful multi-ply film structures are those as disclosed in U.S. Pat. No. 3,549,389, the teachings of which are incorporated herein by reference thereto. Such blends may also be used for preparation of oriented film structures by utilization of the well known bubble technique for making films in tubular form.

The compositions disclosed by the present invention are useful in other processes, such as molding, slot extrusion and other thermal fabrication techniques to form films, fibers, foils, molded articles and other forms.

The following specific examples are intended to illustrate the invention without limiting the scope thereof. All parts and percentages are by weight unless otherwise indicated.

EXAMPLE 1

A crystalline copolymer comprising about 88 percent vinylidene chloride and about 12 percent vinyl chloride was prepared by suspension polymerization in a batch process using diisopropyl peroxydicarbonate as the initiator and methyl cellulose as the suspension agent in a manner well known in the art. The crystalline copolymer so produced had a weight average particle size distribution, based upon a screen analysis, of from about 40 to about 400 microns. A majority of the copolymer particles had a weight average particle size in the range of from about 250 to about 270 microns.

A premixture of magnesium oxide and the alkylnaphthalene sodium sulfonate compound was prepared by: (1) weighing out about 12 pounds magnesium oxide, the magnesium oxide having an average particle size of about 0.5 micron; (2) withdrawing about ½ pound of the amount weighed out in step 1, placing it in a covered container with from about 2.5 to about 3.0 grams of a blend of sodium monomethylnaphthalene sulfonate and sodium dimethylnaphthalene sulfonate, the blend having a mole ratio of sodium dimethylnaphthalene sulfonate to sodium monomethylnaphthalene sulfonate of about 50:50, commercially available under the trade designation Petro ® AG Superfine from the Petro Chemical Company, and shaking the container vigorously; and (3) placing the result of step 2 in a high speed blender commercially available under the trade designation Welex Model 2457 F. H. Papenmeier K. G. Company with the balance of the approximately 12 pounds of magnesium oxide and operating the blender for about 4 minutes.

The premixture so prepared was mixed with about 3000 pounds of the vinylidene chloride/vinyl chloride copolymer using a Conaform Conagrator 3340, a conical blender or vacuum dryer commercially available from Patterson Industries. A smooth, homogenous, free-flowing product free of agglomerates visible to the naked eye resulted which was then extruded in a 4½ inch extruder. The extruder had a length to diameter ratio of 20 to 1, a blown film die and a conventional quench bath to make a polymeric tape material. A film blown and stretched from the resulting tape was not only free of bubbles, holes or visible white specks but was of excellent color. In addition, the film exhibited very good barrier properties, as shown below, in terms of Oxygen Transmission Rates (OTR) and water vapor transmission rates (WVTR).

A Mocon Oxtran 10-50, an oxygen transmission rate measuring device commercially available from Modern Controls, Inc., was used to measure the OTR. A Mocon Infrared Water Vapor Diffusometer, a water vapor transmission rate measuring device commercially available from Modern Controls, Inc., was used to measure the WVTR. The average OTR as determined by at least 3 steady state readings was about 0.07 cc/mil/100 $in^2$/24 hr/atm at 23° C. The average WVTR as determined by at least 3 constant readings was about 0.04 gms/mil/100 $in^2$/24 hr at 100° F.

EXAMPLE 2

By way of comparison, resin was prepared as in Example 1 except for the addition of the blend of sodium monomethylnaphthalene sulfonate and sodium dimethylnaphthalene sulfonate commercially available under the trade designation Petro ® AG Superfine from the Petro Chemical Company. The resin so prepared contained a substantial number of visible white agglomerates or lumps. The resin was then screened to remove lumps in accordance with U.S. Pat. No. 3,891,598, and extruded as in Example 1 into a film tape. The tape contained visible white specks which interfered with the measurements of OTR, presumably because of leakage through the white specks.

Similar results are obtained with other vinylidene chloride polymer resins as well as with varying amounts of alkali metal salts of alkylaryl sulfonic acids, variations being made within limits claimed for the present invention. Similar results are also obtained with the other above-identified inorganic particulate additives, particularly when such additives are added in conjunction with magnesium oxide powder.

If the processes described above are not followed, the flow characteristics of the inorganic particulate additives are not advantageously affected by the addition of the alkali metal salts of alkylaryl sulfonic acids.

What is claimed is:

1. An improved process for preparing extruded vinylidene chloride copolymer film containing an effective amount of one or more inorganic particulate additives, said film being generally free of bubbles, holes and white specks, said film being made by (a) preparing a blend of (1) a dry, powdered, generally plasticizer-free, normally crystalline vinylidene chloride polymer having polymerized therein from about 70 to about 95 percent by weight vinylidene chloride and from about 30 to about 5 percent by weight of at least one monoethylenically unsaturated monomer copolymerized therewith, and (2) the inorganic particulate additives, each additive having an average particle size of greater than about 0.5 micron and less than about 40 microns, and (b) thermally fabricating said blend into film form by extrusion, the improvement which comprises making a preblend of the inorganic particulate additives with from about 0.02 to about 0.5 weight percent, based on weight of the inorganic particulate additives of an alkali metal salt of an alkylaryl sulfonic acid and admixing the preblend with the vinylidene chloride polymer.

2. The process of claim 1 wherein the normally crystalline vinylidene chloride polymer is a copolymer of vinylidene chloride and vinyl chloride.

3. The process of claim 2 wherein said polymer is a copolymer of about 85 percent by weight vinylidene chloride and 15 percent by weight vinyl chloride.

4. The process of claim 1 wherein the alkali metal salt of an alkylaryl sulfonic acid is selected from the group consisting of sodium dimethyl naphthalene sulfonate, sodium monomethyl naphthalene sulfonate and blends thereof.

5. The process of claim 1 wherein the alkali metal salt of an alkylaryl sulfonic acid is a blend of sodium monomethyl naphthalene sulfonate and sodium dimethyl naphthalene sulfonate.

6. The process of claim 1 wherein the inorganic particulate additives are selected from the group consisting of magnesium oxide, titanium dioxide, calcium carbonate and tetrasodium pyrophosphate.

7. The process of claim 1 wherein the inorganic particulate additive is magnesium oxide.

8. The process of claim 1 wherein the amount of each inorganic particulate additive is from about 0.1 to about 0.8 percent by weight, based upon weight of the vinylidene chloride copolymer.

9. The process of claim 1 wherein the amount of each inorganic particulate additive is from about 0.3 to about 0.5 percent by weight, based upon weight of the vinylidene chloride copolymer.

10. An improved process for preparing extruded vinylidene chloride copolymer film containing an effective amount of one or more inorganic particulate additives, said film being generally free of bubbles, holes and white specks, said film being made by (a) preparing a blend of (1) a dry, powdered, generally plasticizer-free, normally crystalline vinylidene chloride copolymer having polymerized therein from about 70 to about 95 percent by weight, based on copolymer weight, vinylidene chloride and from about 30 to about 5 percent by weight, based on copolymer weight, of at least one monoethylenically unsaturated monomer copolymerized therewith, and (2) the inorganic particulate additives, each additive having an average particle size of greater than about 0.5 micron and less than about 40 microns, and (b) thermally fabricating said blend into film form by extrusion, the improvement which comprises dividing the inorganic additives into a first portion and a second portion, dividing the vinylidene chloride copolymer into a first portion and a second portion, forming a concentrate, the concentrate being formed by first admixing the first portion of the inorganic additives with from about 0.02 to about 0.5 weight percent, based upon total inorganic additive weight, of an alkali metal salt of an alkylaryl sulfonic acid using a high speed mixing means, then mixing in the second portion of the inorganic additives and the first portion of the vinylidene chloride copolymer, the concentrate then being blended with the second portion of the vinylidene chloride copolymer, whereby the blend and the film made therefrom are generally free of agglomerates without the necessity of an intermediate step to remove agglomerates.

* * * * *